Oct. 9, 1923.

W. R. KEPLER

TIRE REPAIRING TOOL

Filed May 31, 1919

1,470,575

Witness:

Inventor:
Winfred R. Kepler:
By
Atty

Patented Oct. 9, 1923.

1,470,575

UNITED STATES PATENT OFFICE.

WINFRED R. KEPLER, OF AKRON, OHIO, ASSIGNOR TO THE FIRESTONE TIRE AND RUBBER COMPANY, OF AKRON, OHIO, A CORPORATION OF OHIO.

TIRE-REPAIRING TOOL.

Application filed May 31, 1919. Serial No. 300,928.

*To all whom it may concern:*

Be it known that I, WINFRED R. KEPLER, a citizen of the United States, residing at Akron, in the county of Summit, State of Ohio, have invented certain new and useful Improvements in Tire-Repairing Tools, of which the following is a specification.

This invention relates to a hand tool which is particularly adaptable for use in repairing pneumatic tire casings. It is frequently necessary in repairing casings to cut away ruptured or decayed portions of the fabric forming the casing in order to replace such portion with new fabric. It is necessary to cut or score the fabric which it is desired to remove and to pull or tear away the part which has been cut out.

It is the object of this invention to construct a tool which will be especially adaptable for this purpose and will combine in a single instrumentality a cutting element for severing or scoring the fabric, and a hook which can be used to tear away the layers of fabric.

In the drawing accompanying this application is shown one form of my invention, but it is not the intention that it shall be limited to the exact form shown, as it is possible to make alterations and modifications without affecting the invention.

Figure 4:
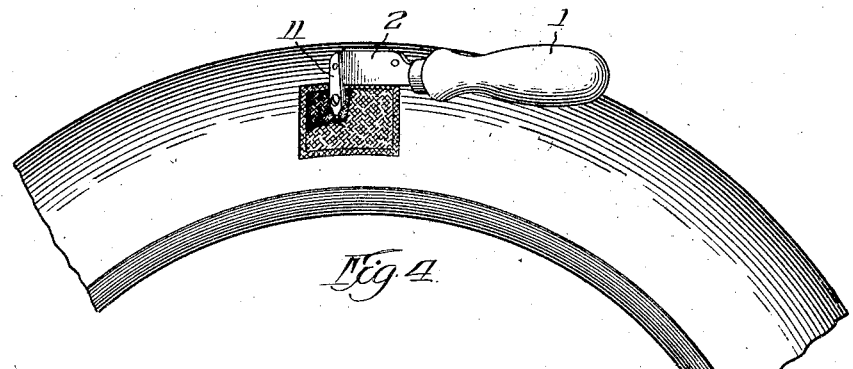
Fig. 4 is a view illustrating the method of use.
Figure 3:
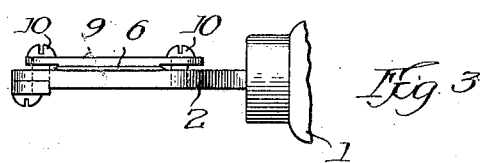
Fig. 3 is an edge view.

The tool comprises a handle 1 in which is driven the L-shaped head 2, the main body of which is a flattened blade, having a transverse projection 3 on its outer end. One edge of the blade is formed with two rounded surfaces 4 and 5 between which is located the cutting blade 6. This is in any suitable form, but preferably a thin steel blad, having two cutting edges 7 and 8 located adjacent the surfaces 4 and 5. The blade is held against the side of the tool head by a bridge piece 9, secured by screws 10 and capable of adjustment so that the blade can be set to any depth.

Across the end of the head is secured a plate 11, one end of which coincides with the rounded surface 5, while the other end extends beyond the tool and is provided with a sharp hook or claw 12 which is designed to engage in the fabric.

Figure 1:
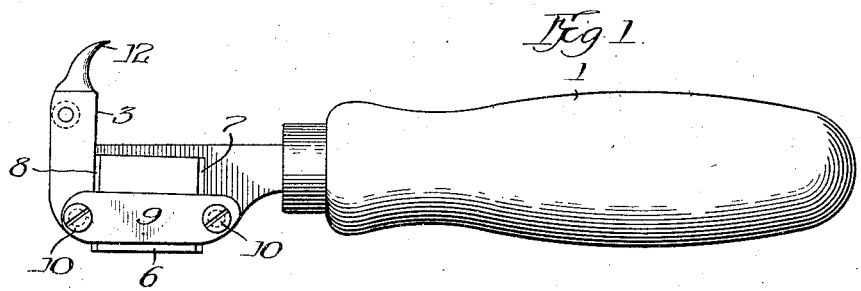
Fig. 1 is a side view of the hand tool.
Figure 2:
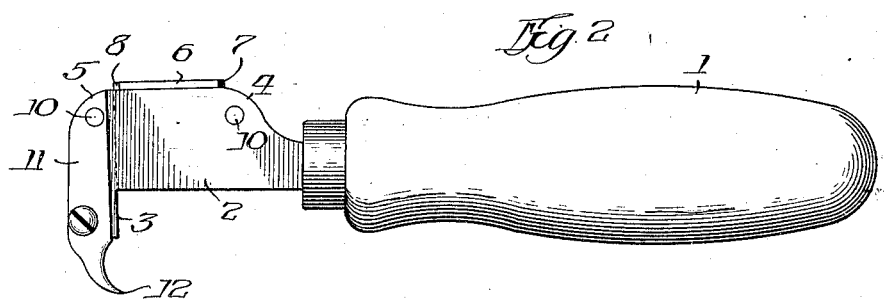
Fig. 2 is a side view in the opposite direction from Fig. 1.

The method of use of the tool is illustrated in Fig. 4. When it is desired to remove a section of fabric, the tool is held in the position shown in Fig. 1 and drawn or pushed over the surface of the carcass, the depth of the cut being regulatable by the adjustment of the blade, the flat edge of the head 2, and the edge of the bridge piece 9 preventing the entrance of the blade into the carcass below the regulated depth of the cut as governed by the distance which the blade projects beyond these surfaces. The two edged blade is advantageous as it permits the knife to cut by both a pulling and a pushing operation, whereby a neat, square cornered incision can be made. When the piece has been cut around, the tool is reversed and the hook or pick inserted into the fabric, which is pulled away from the carcass in the manner shown.

I do not intend to be limited to details of the construction, but consider such modifications as come fairly within the scope of the appended claims within my invention and covered thereby.

I claim:

1. A tool for use in repairing tires or for similar purposes comprising, a handle portion, a tool head having a straight tire engaging edge terminating in rounded corners for clearing the tire, a flat double edged blade adapted to be adjustably secured between the rounded corners of the head to project below the straight edge thereof, and a bridge member for clamping the blade against one side of the head also having a straight tire engaging edge adapted to parallel the straight edge of the head.

2. A tool for use in repairing tires or for similar purposes comprising, a handle portion, a tool head having a straight tire engaging edge terminating in rounded corners for clearing the tire, a flat double edged blade adapted to be adjustably secured between the rounded corners of the head with its cutting edges projecting below the straight edge thereof, and a bridge member for clamping the blade against one side of the head having a straight tire engaging edge adapted to parallel the straight edge of the head and rounded ends for clearing the tire.

3. A tool for use in repairing tires or for similar purposes comprising, a handle, a flat tool head having a hook-shaped front edge portion adapted to provide a countersunk seat, and a tool having a shank adapted to be secured against said seat said tool having a claw at one end projecting beyond one side edge of the head.

WINFRED R. KEPLER.